United States Patent
Cristian et al.

(10) Patent No.: US 10,860,802 B2
(45) Date of Patent: Dec. 8, 2020

(54) CHATBOT VERSION COMPARISON

(71) Applicant: EntIT Software LLC, Sunnyvale, CA (US)

(72) Inventors: Mihai Cristian, Cluj-Napoca (RO); Paul Damian, Cluj-Napoca (RO)

(73) Assignee: MICRO FOCUS LLC, Santa Clara, CA (US)

( * ) Notice: Subject to any disclaimer, the term of this patent is extended or adjusted under 35 U.S.C. 154(b) by 87 days.

(21) Appl. No.: 15/920,192

(22) Filed: Mar. 13, 2018

(65) Prior Publication Data

US 2019/0065465 A1 Feb. 28, 2019

(30) Foreign Application Priority Data

Aug. 31, 2017 (EP) ..................... 17464011

(51) Int. Cl.
G06F 40/30 (2020.01)
H04L 12/58 (2006.01)
G06F 11/36 (2006.01)

(52) U.S. Cl.
CPC .......... *G06F 40/30* (2020.01); *G06F 11/3688* (2013.01); *H04L 51/02* (2013.01); *H04L 51/16* (2013.01)

(58) Field of Classification Search
CPC .. G06F 17/2785; G06F 11/3688; H04L 51/02; H04L 51/16
See application file for complete search history.

(56) References Cited

U.S. PATENT DOCUMENTS

| | | | | |
|---|---|---|---|---|
| 8,725,813 B2* | 5/2014 | Nalliah | ................... | H04L 51/38 709/206 |
| 9,137,184 B2* | 9/2015 | Kulkarni | ................ | H04M 3/28 |
| 9,444,935 B2* | 9/2016 | Aldecoa | ............. | H04M 3/4936 |
| 9,978,361 B2* | 5/2018 | Sarikaya | ............. | G06F 17/2775 |
| 10,171,662 B1* | 1/2019 | Zhou | ................... | H04M 3/5175 |
| 10,303,773 B2* | 5/2019 | Curtis | ..................... | G06F 40/35 |
| 10,306,212 B2* | 5/2019 | Luo | ....................... | H04N 13/296 |
| 10,311,871 B2* | 6/2019 | Newendorp | ............ | G06F 3/167 |
| 10,357,881 B2* | 7/2019 | Faridi | ................. | B25J 11/0015 |
| 10,460,215 B2* | 10/2019 | Herold | .................. | G06F 17/279 |
| 2003/0182391 A1* | 9/2003 | Leber | .................... | G06F 16/951 709/217 |
| 2006/0150119 A1* | 7/2006 | Chesnais | ............... | G06F 16/243 715/810 |
| 2007/0260651 A1* | 11/2007 | Pedersen | ................ | G06F 16/30 |
| 2009/0046154 A1* | 2/2009 | Tao | ........................ | H04N 17/00 348/181 |

(Continued)

OTHER PUBLICATIONS

Florian Treml, "Automated Testing for Chatbots on Codeship with TestMyBot" Jun. 23, 2017, 9 pages. https://chatbotsmagazine.com/automaled-testing-for-chatbots-on-codeship-with-testmybot-75746d4226f7.

(Continued)

*Primary Examiner* — William G Trost, IV
*Assistant Examiner* — Monishwar Mohan

(57) ABSTRACT

According to an example, a system may receive a conversation with a first chatbot version through a messaging application, generate a first conversation file from the conversation, execute the first conversation file with a second chatbot version to generate a second conversation file, and compare the first conversation file with the second conversation file.

20 Claims, 3 Drawing Sheets

(56) References Cited

U.S. PATENT DOCUMENTS

| | | | | |
|---|---|---|---|---|
| 2009/0125875 | A1* | 5/2009 | Schmitter | G06F 8/20 |
| | | | | 717/101 |
| 2009/0254836 | A1* | 10/2009 | Bajrach | G11B 27/031 |
| | | | | 715/745 |
| 2009/0292778 | A1* | 11/2009 | Makar | G06F 16/00 |
| | | | | 709/206 |
| 2011/0238633 | A1* | 9/2011 | Garandeau | G06F 16/1873 |
| | | | | 707/690 |
| 2011/0307496 | A1* | 12/2011 | Jones | G06F 16/24 |
| | | | | 707/748 |
| 2013/0226614 | A1* | 8/2013 | Bustani | G06F 19/324 |
| | | | | 705/3 |
| 2014/0067375 | A1* | 3/2014 | Wooters | G06F 40/40 |
| | | | | 704/9 |
| 2014/0122619 | A1* | 5/2014 | Duan | G06F 40/20 |
| | | | | 709/206 |
| 2014/0279050 | A1* | 9/2014 | Makar | G06N 20/00 |
| | | | | 705/14.66 |
| 2016/0134752 | A1* | 5/2016 | Aldecoa | H04M 3/4936 |
| | | | | 379/88.01 |
| 2016/0239717 | A1* | 8/2016 | Muthaiah | G06K 9/2063 |
| 2016/0313906 | A1* | 10/2016 | Kilchenko | G06F 3/04847 |
| 2017/0344532 | A1* | 11/2017 | Zhou | G06F 40/56 |
| 2018/0048594 | A1* | 2/2018 | de Silva | H04L 51/36 |
| 2018/0053119 | A1* | 2/2018 | Zeng | G06N 20/00 |
| 2018/0130156 | A1* | 5/2018 | Grau | G06F 16/248 |
| 2018/0131645 | A1* | 5/2018 | Magliozzi | G06F 40/30 |
| 2018/0212904 | A1* | 7/2018 | Smullen | H04L 51/02 |
| 2018/0359198 | A1* | 12/2018 | Eidem | H04L 51/02 |
| 2018/0365212 | A1* | 12/2018 | Banerjee | G06F 40/253 |
| 2019/0005024 | A1* | 1/2019 | Somech | G06F 16/243 |
| 2019/0034409 | A1* | 1/2019 | Curtis | G06F 40/123 |
| 2019/0043106 | A1* | 2/2019 | Talmor | G06N 3/006 |
| 2019/0043483 | A1* | 2/2019 | Chakraborty | G10L 15/16 |

OTHER PUBLICATIONS

Florian Treml, "Capture & Replay: Bringing Chatbot Code Quality to a New Level", Mar. 22, 2017, 5 pages. https://chatbotsmagazine.com/capture-replay-bringing-chatbot-code-quality-to-a-new-level-c0312971311a.

Adam Wills, "Our 1st chatbot design sprint with . . . ummm . . . farmers in Kenya", Sep. 27, 2016, 9 pages. https://chatbotsmagazine.com/our-1st-chatbot-design-sprint-with-ummm-farmers-in-kenya-a716436c4964.

Kevin Scott, "Testing Chatbots: How to Ensure a Bot Says the Right Thing at the Right Time", Jul. 20, 2016, 6 pages. https://chatbotsmagazine.com/testing-chatbots-how-to-ensure-a-bot-says-the-right-thing-at-the-right-time-58857ceb97f1.

Gunther Cox, "Unit Testing", 2009, 2 pages. http://chatterbot.readthedocs.io/en/stable/testing.html.

Imaginea, "What is Bot-bot?", 2009, 2 pages. http://imaginea.github.io/bot-bot/.

* cited by examiner the following figure shows# CHATBOT VERSION COMPARISON

PRIORITY

The present application claims priority under 35 U.S.C. 119(a)-(d) to European patent application number 17464011.0, having a filing date of Aug. 31, 2017, the disclosure of which is hereby incorporated by reference in its entirety.

BACKGROUND

Many products offer chatbots as a way for users to access application features through a messaging application. The chatbot may conduct a conversation with a user via auditory or textual methods and may attempt to simulate how a human may behave as a conversational partner.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
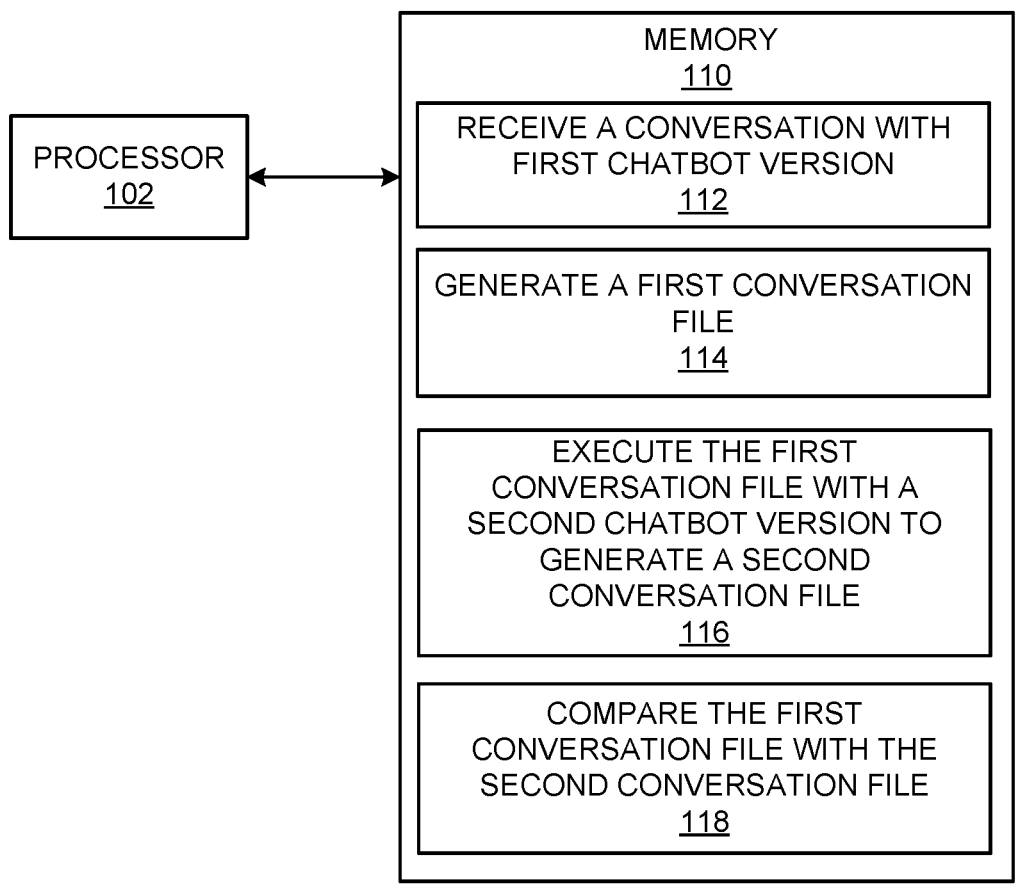
FIG. 1 shows a block diagram of an example system.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. As used herein, the terms "a" and "an" are intended to denote at least one of a particular element, the term "includes" means includes but not limited to, the term "including" means including but not limited to, and the term "based on" means based at least in part on.

In some examples, automated tests for chatbots depend on implementation details, and lack a unified approach. Chatbot application testing using common software testing methods may bring an unnecessary level of complexity instead of ease of deployment that chatbots are intended to bring to the applications. Furthermore, testing of a chatbot involves a great percentage of duplicate code as each test may follow the same routine to establish a connection through a messaging application, post messages, and verify the outcome of the conversation. According to an example of the present disclosure, an application-level record-and-play approach to chatbot testing may be implemented. The chatbot testing may employ the chatbot functionality from a messaging application that integrates with the chatbot. The chatbot test may model a conversation between a user and a chatbot. The conversation may be obtained from an application programming interface (API) of the messaging application and may be converted into a tag-based conversation file, which may be used for testing a new version of the chatbot. A conversation runner may create a test case from the tag-based conversation file and execute the test case for a different version of the chatbot or a different version of an application integrated with the chatbot. The obtained results from executing the test case on different versions of the chatbot are compared to determine whether there are differences and to determine whether the new version passes or fails the test case. Use of the messaging application may eliminate the implementation complexity from the test case generation by allowing a user to easily create chatbot test cases without extensive knowledge of the chatbot inner functionality and the chatbot programming logic.

According to an example of the present disclosure, different versions of a chatbot may be tested based on the same conversation with a user. A chatbot is a computer program that may automatically conduct a conversation via auditory or textual outputs through a messaging application. The chatbot programs may be designed to convincingly simulate a human behavior as a conversational partner or to provide a friendly interface for a source application. Some chatbots use sophisticated natural language processing systems, but many simpler chatbots may scan for keywords within the input and retrieve a reply with the most matching keywords (or the most similar wording pattern) from a database. A messaging application may include an application that facilitates a form of message exchange, such as text messaging, instant messaging, social messaging applications. The chatbots may work with a variety of messaging applications, such as Slack™, Skype™, etc.

With reference first to FIG. 1, there is shown a block diagram of an example chatbot testing system 100 that may perform automated chatbot testing, according to an example of the present application. It should be understood that the system 100 depicted in FIG. 1 may include additional components and that some of the components described herein may be removed and/or modified without departing from a scope of the system 100 disclosed herein.

The system 100 may include a processor 102 that may control operations of the system 100. The processor 102 may be a semiconductor-based microprocessor, a central processing unit (CPU), an application specific integrated circuit (ASIC), a field-programmable gate array (FPGA), and/or other hardware device.

The system 100 may also include a memory 110 that may have stored thereon machine-readable instructions 112-118 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110 is an example of a computer readable storage medium that may be used in the system 100. Other types of computer readable storage mediums may be used as well. The memory 110 or other types of computer readable storage mediums may include a non-transitory machine-readable storage medium, where the term "non-transitory" does not encompass transitory propagating signals.

The processor 102 may fetch, decode, and execute the instructions 112 to receive a user conversation with a first version of a chatbot. For example, text messages are sent from a user via a messaging application to a first version of the chatbot. The first version may be a version of the chatbot that was previously tested and verified to be operating correctly. The chatbot may respond to the text messages from the user and send the responses in messages back to the messaging application. The messaging application may display the messages from the chatbot to the user. The processor 102 may access the messaging application, for example, via an API, to obtain the incoming messages from the chatbot and to obtain the outgoing messages sent to the chatbot.

The processor 102 may fetch, decode, and execute the instructions 114 to generate a first conversation file. For example, the messages obtained from the messaging application are formatted into a conversation file, which may be a text file. Furthermore, the processor 102 may include tags describing attributes of the messages, such as source of the message (e.g., user or chatbot). Other attributes may include a timestamp, etc. The tags are further described below.

The processor 102 may fetch, decode, and execute the instructions 116 to execute the first conversation file with a second version of the chatbot to generate a second conversation file. For example, the second version is a new version of the chatbot to be tested or a new version of the source application chatbot represents.

The processor 102 may fetch, decode, and execute the instructions 118 to compare the first conversation file with the second conversation file. For example, if the second version of the chatbot is responding differently from the first version to the same request, then the different response is detected and may be identified as a potential failed test case.

Figure 2:
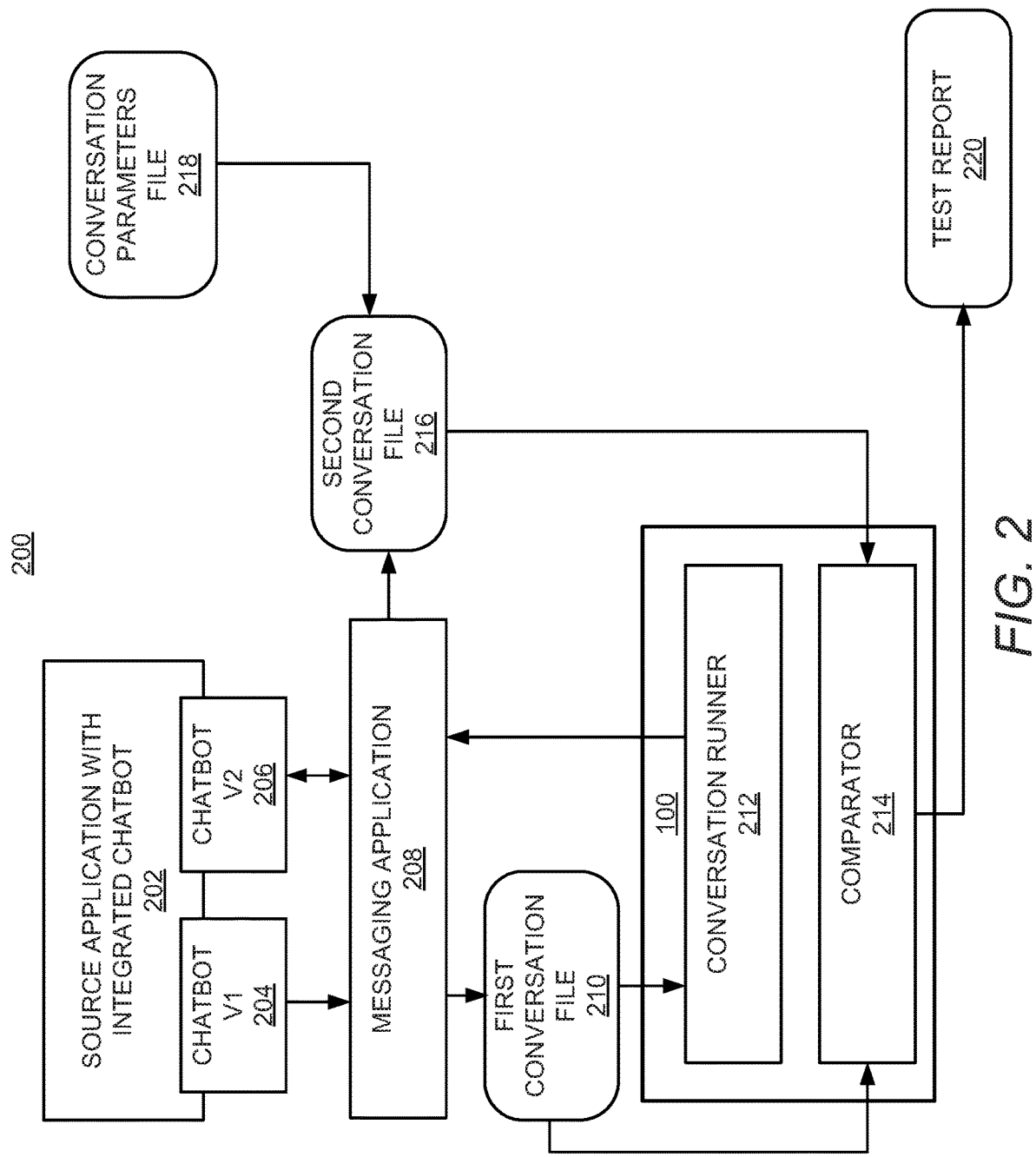
FIG. 2 shows a diagram of an example of a chatbot testing environment.

Turning to FIG. 2, there is shown a diagram of an example of a chatbot testing environment 200 using the chatbot testing system 100. The system 100 may reduce a test case for testing different chatbot version to a conversation file 210 representing a conversation between a chatbot 204 and a user. The conversation file may be generated from an actual conversation between the user and the chatbot 204 inside a messaging application 208 by recording conversation lines and inserting tags indicating conversation entities such as user and chatbot. The user may run a test once for a first version of the chatbot 204 to generate the conversation file 210 representing a conversation between the user and the first version of the chatbot 204 integrated with a source application 202. Subsequently, the user may employ an automated test of a second version 206 of the same chatbot 204 integrated with the source application 202 using the conversation file 210. A conversation runner 212 may execute a script from the conversation file 210 and may produce a conversation file 216 representing the same user conversation with the second version of the chatbot 206 using the same user quires from the conversation file 210. The conversation runner 212 may tag the conversation file 210 in order to enter the same user queries to the chatbot 206 into the messaging application 208. Then, comparator 214 may compare the conversation files 210 and 216 and may generate a test report 220 indicating whether the files are identical or different. If the files are identical, the current version of the chatbot may be considered usable, e.g., the current version passed the test case represented by the conversation file 210. If the files are not identical, the current version of the chatbot may need to be fixed by developers and retested, e.g., the current version failed the test case.

According to example of FIG. 2, first the user may start a conversation with a first version of a chatbot employing the chatbot conversation functionality via a messaging application 208. For example, the user may communicate with a source application 202 using a messaging application 208, such as, for example, Slack™, Skype™, Facebook™ messenger, etc. The messaging application 208 and the chatbot versions 204 and 206 may be stored on a computer readable storage medium accessible by a processor, such as the processor 102. A chatbot 204 may be integrated with the source application 202 and the user may have a conversation with the chatbot 204 acting on behalf of the source application 202. The interaction between the user and the chatbot 204 is captured and stored in a text file, which may be downloaded to be used as a test conversation file 210 for a different version of the chatbot 206. The conversation runner 212 may convert the conversation file into a tag-based file or script that may describe the conversation scenario to be implemented with the second version of the chatbot 206 being tested. In the conversation file 210, user input provided to the chatbot may be identified using the "user" tag while chatbot replies are identified by the "chatbot" tag. The user may enhance the conversation file by adding external action calls. The external action calls may be identified by the "!" tag. The user may specify the external action, which may be translated to a method that may be called by the chatbot. The conversation may be parameterized to allow for dynamic value injection from conversation parameters file 218 during a test run using a variable parameter "$" tag. In other words, variable parameters tagged by "$" may be replaced with different values for providing different versions of the same test case. For example, the variable "$duplicate_name_name" in the example below may take various parameter values that may be injected before or during a test case run. An example of a user-chatbot conversation is shown below. In the example, the source application is dca, which is a data center automation application, and the user is requesting information from the dca about deployments in a data center. The example is as follows:

user: dca list watches
chatbot: [{u'color': u'd00000', u'text': u'No deployments are being watched at the time.', u'fallback': u'No deployments are being watched at the time.', u'id': 1, u'title': u'Watched deployments'}]
user: dca get deployment id=779
chatbot: [{u'color': u'd00000', u'text': u'The deployment with given id: 779 not found.', u'fallback': u'The deployment with given id: 779 not found.', u'id': 1, u'title': u'The request was executed with an error!'}] !wait 5
user: dca get deployment "$duplicate_name_name"
chatbot: [{u'title': u'Ambiguous request!', u'color': u'daa038', u'text': u"I've found these deployments with the name you requested. Select the one you are after by specifying the deployment id like this: '@borsec dca get deployment id=<id>'", u'fields': [{u'short': True, u'value': u'Owned by user from group', u'title': u'3cf129d0-b8e5-43b9-b62247432afc0025'}, {u'short': True, u'value': u'Owned by user from group', u'title': u'5ff842c0-a528-4ef3-afb1-d83ea35ae299'}], u'fallback': u"I've found these deployments with the name you requested. Select the one you are after by specifying the deployment id like this: '@borsec dca get deployment id=<id>'", u'id': 1}]

The values for variable conversation parameters may be defined in a separate JSON file 218. In the above example, the parameters file 218 may contain the following line: {'duplicate_name_name': 'duplicate_deployment_name'}. The keyword line "wait 5" tagged with "!" was added. The conversation runner 212 may interpret this as to run the script mapped to the keyword "wait" along with argument "5".

In one example, the conversation runner 212 may load the conversation file 210 into a conversation files repository and may insert user defined parameters into the conversation file. Then, the conversation runner 212 may create a connection with the chatbot 206 using the messaging application 208. The chatbot 206 may represent a new version of the chatbot 204 to be tested. The conversation runner 212 may tag and replay the conversation from the conversation file 210. When the conversation file 210 is replayed, each user tag may trigger a post into the messaging application 208. Each action tag may trigger a method (action call) to the chatbot 206. As a result of this test run, a new messaging application 208 instance reproducing the test case conversation from the file 210 may be created. Then, the conversation runner 212 may generate the conversation file 216 based on execution of the scenario from the conversation file 210 with the current chatbot version via the messaging application 208.

The comparator 214 may compare the conversation file 210 against the conversation file 216 in order to determine whether the conversation represented by the conversation file 216 matches the conversation represented by the conversation file 210 produced by user communication with the original version of the chatbot 204. The comparator 214 may generate the test report 220. If the files 210 and 216 do not match, the new version of the chatbot 206 may need to be fixed and retested by developers. In one example, a new version of a chatbot 206 may differ slightly from the original version of the chatbot 204. Consequently, the conversation files 216 and 210 may also differ even if the new version 206 is functioning properly. In this case, a threshold degree of matching may be used. For example, if a threshold is set at 90%, the new version 206 may be considered acceptable and no further actions by the developers may be needed. In other words, a sufficient number of correct responses are produces by the new version of the chatbot 206. For example, the degree of matching threshold may be used for a string comparison method where a certain sufficient number of matching words or symbols may be used as a threshold value. The described chatbot testing environment 200 may be lightweight and simple to use. The chatbot may be extended to any messaging applications 208 that support chatbot integrations by extending the chatbot base class with application-specific operations. In one example, the actions plugin and parameterization feature may be used to increase the flexibility of the conversation runner 212, which may be integrated with other automated testing applications.

The following examples are intended to illustrate the chatbot testing environment 200 depicted in FIG. 2. A web-based movie rental application may be used as an example. The movie rental application may allow users to search for movies, check the availability of a given movie title, and set favorites for which a user may receive notifications as soon as they become available for rent. The movie rental application may have a chatbot, which may allow users to access the movie rental application functionalities by sending messages to the chatbot. The chatbot may be an executable version that is under development and the challenge may be to test the chatbot functionality using automation. A user may want to run automated tests without knowledge of the technology and programming environment in which the chatbot or the movie rental application have been created. In this example, three user stories (possible test case scenarios) may be tested in order to validate the chatbot functionality:

test case 1—search for all movies of a specific genre that have been recently added to the inventory;

test case 2—get details about a specific movie using its title; and test case 3—set a movie as favorite and receive notification from the chatbot once the movie is available for rent.

In order to test the chatbot, a user may set up an environment where the user may send commands to the chatbot and verify its responses. For chatbot testing, the user may have to:

Install the movie rental application;
Install the chatbot; and

Add the chatbot to a messaging application 208 that supports API calls. For each of the above test cases, the user may invoke a new instance of the messaging application 208 and may communicate with the chatbot through the messaging application 208. Then, the user may have a conversation with the chatbot. For the test case 1 (i.e., search for all movies of a specific genre that have been recently added to the inventory) the conversation between the user and the chatbot may look like this:

User: @moviechatbot show me action movies added this month

To which the chatbot, after querying the web application may reply with a list of titles Chatbot: These are the action movies added in July: Title1, Title2, Title3

This conversation may be referred to as Test 1.

For the test case 2 (get details about a specific movie using its title) the conversation between the user and the chatbot may look like this:

User: @moviechatbot show me "Independence Day Resurgence"

To which the chatbot may reply

Chatbot: "Independence Day Resurgence"; released in 2016; Genre: action, sci-fi, rating 8/10, Director: Roland Emerich, available for rent: YES This conversation may be referred to as Test 2.

For the test case 3 (set a movie as favorite and receive notification from the chatbot once the movie is available for rental) the conversation between the user and the chatbot may look like this:

User: @moviechatbot set favorite "Reservoir Dogs"

Chatbot: Favorite set. You will be notified once "Reservoir Dogs" is available for rent A call to the application may be made in order to set the availability of the movie to "True." Once this is done, the chatbot may notify the user:

Chatbot: Hello user! Good news "Reservoir Dogs" is now available for rent. Do you want to reserve it?

This conversation may be referred to as Test 3.

According to examples of the present disclosure, the system 100 may convert these test cases to automated test scripts to be performed with subsequent versions of the chatbot. A conversation runner 212 may parse a conversation history obtained from the messaging application 208 via its API based on the name of the conversation. The conversation history may be stored in a specific format defined by the messaging application API. In one example, JSON file format may be used for storing the conversation history as a suitable format for many APIs. By parsing the formatted conversation history, the conversation runner 212 may obtain data to create a conversation file script, which serves as an automated test for a new version of the chatbot. The conversation file format may look like <Message Timestamp>:<prefix>:<message body>. The prefix identifies a party who created the message body. The "user" prefix may be used for a person participating in the conversation, while the "chatbot" prefix may be used for the chatbot being tested. The message body may be taken from the conversation history and stored in the conversation file. The timestamp may be used to measure chatbot response at application level. The timestamp may be used over multiple automated test runs to detect drops in chatbot response times.

For example, a conversation file generated for the conversation Test 1 may look like:

00_00_00: user: @moviechatbot show me action movies added this month
00_00_05: chatbot: [{u'color': u'd00000', u'text': u'These are the action movies added in July: Title1, Title2, Title3.', u'fallback': u'These are the action movies added in July: Title1, Title2, Title3', u'id': 1, u'title': u'JulyActionMovies'}]

This conversation file may be saved in a conversation files repository under the name selected by the user and may be tagged in order to be executed as an automated test script by the conversation runner 212. In one example, an automated chatbot test may be configured. In case of Test 1, configuration may not be needed. However, in case of Test 3, the user may need to edit the generated conversation file in order to refer to a certain action to be performed during the automated replay of the recorded conversation in Test 3:

00_00_00: user: @moviechatbot set favorite "Reservoir Dogs"
00_00_02: chatbot: [{u'color': u'd00000', u'text': u'Favorite set. You will be notified once "Reservoir Dogs" is available for rent', u'fallback': u'Favorite set. You will be notified once "Reservoir Dogs" is available for rent', u'id': 1, u'title': u'ResDogsWatch'}]
00_00_10: chatbot: [{u'color': u'd00000', u'text': u'Hello user! Good news "Reservoir Dogs" is now available for rent. Do you want to reserve it?', u'fallback': u'Hello user! Good news "Reservoir Dogs" is now available for rent. Do you want to reserve it?', u'id': 1, u'title': u'ResDogsTrue'}]

Note that the last reply of the chatbot has been manually triggered by the user. In order for the test to work as an automated test, this reply may be automated using a scripting language. In one example, keywords may be used to identify the scripts to be automated. The keywords may be prefixed using the "!" symbol and the keyword script mappings may be saved in an actions file used by the conversation runner 212.

This is how the edited conversation file may look:
00_00_00: user: @moviechatbot set favorite "Reservoir Dogs"
00_00_02: chatbot: [{u'color': u'd00000', u'text': u'Favorite set. You will be notified once "Reservoir Dogs" is available for rent', u'fallback': u'Favorite set. You will be notified once "Reservoir Dogs" is available for rent', u'id': 1, u'title': u'ResDogsWatch'}]
! action1
00_00_10: chatbot: [{u'color': u'd00000', u'text': u'Hello user! Good news "Reservoir Dogs" is now available for rent. Do you want to reserve it?', u'fallback': u'Hello user! Good news "Reservoir Dogs" is now available for rent. Do you want to reserve it?', u'id': 1, u'title': u'ResDogsTrue'}]

The line tagged with "!" was added. The conversation runner 212 may interpret this as to run the script mapped to the keyword action1. Any text editor may be used to edit the conversation files.

In one example, a keyword may map to a tuple, a pair comprising the scripts location on the machine executing the conversation runner 212 and the command used to execute the script. For example, a user may want to define the action that sets the availability of a given movie title to "True." This may be used in an automated test scenario. The conversation runner 212 may execute a script which may call "enable title" action. This script may take the title of the movie as a parameter. The script may be stored in a scripts folder on the machine hosting the conversation runner 212. The keyword "enable" may be used for this script. Mappings may be stored in the actions file in a JSON format. For example, a script {"enable":{"path":"/scripts/enable_title.py<movie_title>"}, "executable":"python"} may be used to implement external actions handled by an actions handler sub-module of the conversation runner 212, which may read the actions file and may run the script calls. The actions handler may check the output of the call in order to raise errors if necessary.

In one example, a user may run the above test not only for "Reservoir Dogs," but for other movies as well. The conversation file format allows the user to define variables that may receive a specific value only when the test is run. The variables are identified using the $ prefix. This is what the conversation file may look like with a parameter set for the movie title:

00_00_00: user: @moviechatbot set favorite $movie_title
00_00_02: chatbot: [{u'color': u'd00000', u'text': u'Favorite set. You will be notified once $movie_title is available for rent', u'fallback': u'Favorite set. You will be notified once $movie_title is available for rent', u'id': 1, u'title': u'ResDogsWatch'}]
! enable $movie_title
00_00_10: chatbot: [{u'color': u'd00000', u'text': u'Hello user! Good news $movie_title is now available for rent. Do you want to reserve it?', u'fallback': u'Hello user! Good news $movie_title is now available for rent. Do you want to reserve it?', u'id': 1, u'title': u'ResDogsTrue'}]

The conversation parameters file 218 may be used to store the values that a given variable may take: movie_title: ["Title1","Title2","Title3"]. During execution of the above script, the variable may be replaced with the actual value. Thus, several values may produce separate instances of the test case.

As discussed above, the conversation runner 212 may execute the scripts from the conversation file 210. The conversation runner 212 may make calls to the messaging application API. The conversation runner 212 may post messages to the messaging application 208 and may wait for responses from the chatbot 206 being tested. The interaction between the conversation runner 212 and the messaging application 208 may be implemented using an API token generated by the user as a part of the initial test setup. The API token may allow the conversation runner 212 to make calls to the messaging application 208 to:
    initiate a connection between a user and a chatbot;
    post messages; and
    retrieve the conversation history between the user and the chatbot.

The conversation runner 212 may create a new connection between a user and a chatbot for each test or iteration of a test in the case of parameterized tests, and may replay the conversation in the test. The conversation runner 212 may produce automatically-generated conversation in the same format as a test conversation, in order to generate the test results. For parameterized test runs, the conversation runner 212 may save a conversation file for each parameter combination available. The parameter value(s) and the test name may uniquely identify each test instance.

As discussed above, the comparator 214 may compare the conversation file 204 against the test-generated file 206 in order to determine whether the files are identical and to generate a test report 220. The comparator 214 may ignore the action tags that have been manually added. The comparator 214 may replace the defined variables with the actual values assigned to the specific test run. Thus, both conversation files may be used in the same format and may be compared based on their string content. In one example, a hypertext markup language (HTML) test report 220 may be generated for all test results.

Figure 3:
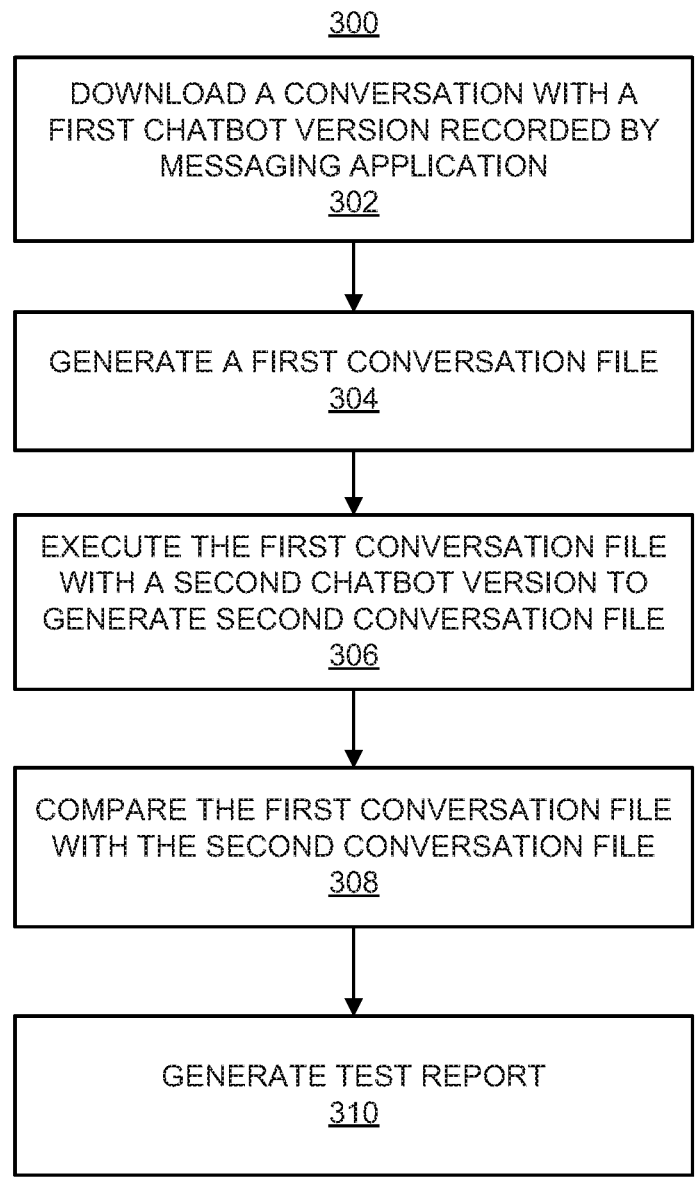
FIG. 3 shows an example method for chatbot testing.

Turning to FIG. 3, there is shown a flow diagram of example method 300 for chatbot testing. The method 300 may be performed by the system described in FIG. 1. For example, the method 300 may be embodied in machine-readable instructions executable by the processor 102. At block 302, the processor 102 may execute the instructions to download a user conversation with a first chatbot version recorded by a messaging application. At block 304, the processor 102 may execute the instructions to generate a first conversation file. At block 306, the processor 102 may execute the instructions to execute the first conversation file with a second version of the chatbot to generate a second conversation file. At block 308, the processor 102 may execute the instructions to compare the first conversation file with the second conversation file. At block 310, the processor 102 may execute the instructions to generate a test report based on comparison of the first and the second conversation files. For example, if the files are not identical—e.g., the current version failed the test case, the current version of the chatbot may need to be fixed by developers and retested.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A system comprising:
    a processor;
    a memory on which is stored machine readable instructions executable by the processor to cause the processor to:
        receive a user conversation with a first version of a chatbot through a messaging application, wherein the first version of the chatbot is a version of the chatbot that was previously tested and verified to be operating correctly;
        generate a first conversation file from the user conversation with the first version of the chatbot, including causing the processor to record user queries and responses from the first version of the chatbot in the user conversation into the first conversation file;
        create a connection between the first conversation file and a second version of the chatbot, wherein the second version of the chatbot is a version of the chatbot to be tested and contains code that is different from code of the first version of the chatbot;
        test the second version of the chatbot using the user queries in the first conversation file, including causing the processor to:
            tag the user queries in the first conversation file,
            replay the first conversation file to cause the tagged user queries in the first conversation file to trigger action calls to the second version of the chatbot, and
            generate a second conversation file that includes responses to the tagged user queries by the second version of the chatbot; and
        compare the responses in the first conversation file with the responses in the second conversation file to determine whether the second version of the chatbot passes or fails a test case.

2. The system according to claim 1, wherein the instructions are executable to cause the processor to associate the first version and the second version of the chatbot with a source application.

3. The system according to claim 1, wherein the instructions are executable to cause the processor to insert a message timestamp and prefixes identifying a user who provided the user queries and identifying the first version of the chatbot that generated the responses.

4. The system according to claim 1, wherein the instructions are executable to cause the processor to insert variable parameters into the first conversation file.

5. The system according to claim 4, wherein the instructions are executable to cause the processor to replace the variable parameters with sets of values stored in a parameters file.

6. The system according to claim 5, wherein the instructions are executable to cause the processor to generate the first conversation file for each set of the sets of values.

7. The system according to claim 1, wherein the instructions are executable to cause the processor to create a connection between a user and a source application and associate the first version of the chatbot with the connection between the user and the source application.

8. The system according to claim 7, wherein the instructions are executable to cause the processor to download the user conversation between the first version of the chatbot and the user recorded by the messaging application.

9. The system according to claim 8, the instructions are executable to cause the processor to insert tags into the user conversation to indicate conversation lines of the user and the first version of the chatbot.

10. The system according to claim 1, wherein the instructions are executable to cause the processor to:
    insert variable parameters into the second conversation file; and
    replace the variable parameters in the second conversation file with different test values for different test runs of the second version of the chatbot.

11. The system according to claim 1, wherein the instructions are executable to cause the processor to compare the responses in the first conversation file with the responses in the second conversation file using text string contents in the first conversation file and text string contents in the second conversation file.

12. The system according to claim 11, wherein the instructions are executable to cause the processor to generate a test report for the second version of the chatbot based on the comparison of the responses in the first conversation file with the responses in the second conversation file.

13. A computer-implemented method executable by at least one processor, the method comprising:
    downloading a user conversation with a first version of a chatbot recorded by a messaging application, wherein the first version of the chatbot is a version of the chatbot that was previously tested and verified to be operating correctly;
    generating a first conversation file from the user conversation with the first version of the chatbot, including recording user queries and responses from the first version of the chatbot in the user conversation into the first conversation file;

creating a connection between the first conversation file and a second version of the chatbot, wherein the second version of the chatbot is a version of the chatbot to be tested and contains code that is different from code of the first version of the chatbot;

testing the second version of the chatbot using the user queries in the first conversation file, including:

tagging the user queries in the first conversation file, replaying the first conversation file to cause the tagged user queries in the first conversation file to trigger action calls to the second version of the chatbot, and generating a second conversation file that includes responses to the tagged user queries by the second version of the chatbot;

comparing the responses in the first conversation file with the responses in the second conversation file to determine whether the second version of the chatbot passes or fails a test case; and generating a test report of the second version of the chatbot based on the comparison of the responses in the first conversation file with the responses in the second conversation file.

14. The method according to claim 13, further comprising detecting drops in response times of the second version of the chatbot based on comparing time stamps from the first conversation file with time stamps from the second conversation file.

15. A non-transitory computer readable medium on which is stored machine readable instructions that, when executed by a processor, cause the processor to:

download a messaging application conversation of a user with a first version of a chatbot, wherein the first version of the chatbot is a version of the chatbot that was previously tested and verified to be operating correctly;

generate a first conversation file from the messaging application conversation with the first version of the chatbot, including causing the processor to record user queries and responses from the first version of the chatbot in the messaging application conversation into the first conversation file;

create a connection between the first conversation file and a second version of the chatbot, wherein the second version of the chatbot is a version of the chatbot to be tested and contains code that is different from code of the first version of the chatbot;

test the second version of the chatbot using the user queries in the first conversation file, including causing the processor to:

tag the user queries in the first conversation file, replay the first conversation file to cause the tagged user queries in the first conversation file to trigger action calls to the second version of the chatbot, and generate a second conversation file that includes responses to the tagged user queries by the second version of the chatbot; and compare the responses in the first conversation file with the responses in the second conversation file to determine whether the second version of the chatbot passes or fails a test case.

16. The non-transitory computer readable medium according to claim 15, wherein the instructions are executable to cause the processor to detect drops in response times of the second version of the chatbot based on a comparison between time stamps from the first conversation file and time stamps from the second conversation file.

17. The non-transitory computer readable medium according to claim 15, wherein the instructions are executable to cause the processor to insert tags describing the responses into the first conversation file.

18. The non-transitory computer readable medium according to claim 15, wherein the instructions are executable to cause the processor to:

insert variable parameters into the second conversation file; and replace the variable parameters in the second conversation file with different test values for different test runs of the second version of the chatbot.

19. The method according to claim 13, further comprising:

inserting tags describing the responses into the first conversation file.

20. The system according to claim 1, wherein the instructions are executable to cause the processor to detect drops in response times of the second version of the chatbot based on a comparison between time stamps from the first conversation file and time stamps from the second conversation file.

* * * * *